Dec. 15, 1970     W. F. HAGEN ET AL     3,546,896
FREEZER PLATES AND WATER DISTRIBUTION FOR ICEMAKING MACHINE
Filed Oct. 1, 1968
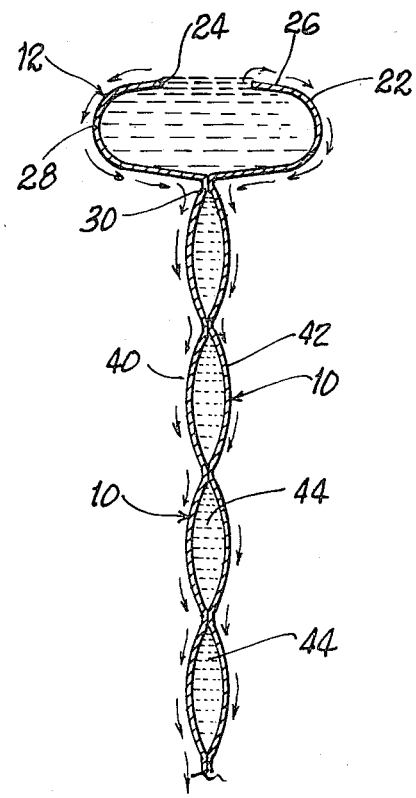
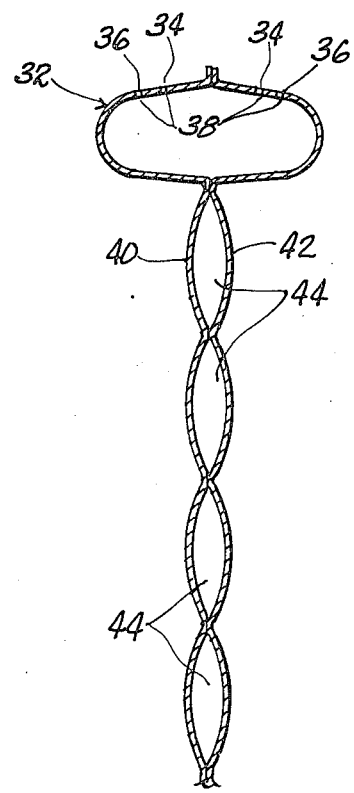
INVENTORS
William F. Hagen
Edward O. Douglas
by McDougall, Hersh, Scott
and Ladd
Att'ys United States Patent Office 3,546,896
Patented Dec. 15, 1970

3,546,896
FREEZER PLATES AND WATER DISTRIBUTION FOR ICEMAKING MACHINE
William F. Hagen and Edward O. Douglas, Denton, Tex., assignors to Turbo Refrigerating Company, Denton, Tex.
Filed Oct. 1, 1968, Ser. No. 764,277
Int. Cl. B05b 1/36; F25c 1/12
U.S. Cl. 62—347                                     8 Claims

ABSTRACT OF THE DISCLOSURE

An icemaking apparatus having a vertically disposed freezing plate with one or both sides defining a freezing surface and over which free water is caused to flow in an amount in excess of that which is congealed on the freezing surfaces and in which the water is uniformly distributed for flow downwardly over the freezing surface from an elongate trough dimensioned to have a length corresponding to the length of the freezing surface and in communication with the upper edge thereof in which the trough has a bottom wall which extends angularly downwardly into engagement with the upper edge of the freezing surface and side and end walls which define the container with a slot or openings in the upper wall extending inwardly and upwardly from the upper edge of the side walls whereby water overflows from the trough through the openings or slots for flow downwardly over the remainder of the top wall and over the side walls and the bottom wall to the upper edge of the freezing surface and in which the freezing plate can be formed of a pair of sheet metal members joined one to the other along their inner surfaces to define the continuous channel sections therebetween which are formed in response to the introduction of fluid under pressure between the plates.

---

This invention relates to icemaking apparatus and particularly to an apparatus having a vertically disposed freezing panel with means for flowing water over opposite faces of the panel whereby the water congeals on the surfaces thereof to form ice cakes.

This invention is addressed to an improvement over the apparatus described and claimed in U.S. Pats. No. 3,074,252 and No. 3,190,083. As described therein, use is made of a freezing plate assembly formed of a pair of flat freezing plates vertically mounted in spaced parallel relation with refrigeration means adjacent the interior surfaces of the plates. Water is caused to flow downwardly over the outer freezing surfaces of the plates whreby an ice layer builds up on each of the freezing surfaces to form ice cakes. When the ice cakes are of sufficient thickness, the freezing cycle is stopped and water above freezing or heat is applied to the inner surfaces of the plates to release the ice cakes from the outer walls. The ice cakes fall gravitationally downwardly for collection or for breaking into smaller pieces and then the freezing cycle is repeated.

In U.S. Pat. No. 3,190,083, the water is applied to the upper surfaces of the freezing plates by means of water sprays spaced across the width of the plates with water being applied in excess of the amount that freezes on the surfaces of the plates so that uch excesses will drain from the lower edges of the plates. In U.S. Pat. No. 3,074,252, the water in excess is drained through openings in the bottom wall of a trough for flow downwardly over the surfaces of the plates.

Especially in the latter arrangement, non-uniformities in the openings, non-uniformities in pressure, and plugging of the drain openings lead to a non-uniformity in the distribution of water flowing downwardly over the surfaces of the plates. Such non-uniformities in water flow lead to exaggerated non-uniformities in the ice cakes formed on the surfaces of the plates whereby the ice making apparatus becomes less economical and an inferior product is produced. Similar non-uniformities and lack of accurate control are derived from the spray application in the apparatus of Pat. No. 3,190,083.

It is an object of this invention to produce an ice making apparatus of the type described in which the application of water onto the surfaces of the freezing plates is more uniform across the width of the plates, which provides a more economical operation, and which produces a more desirable ice cake.

These and other objects of this invention will hereinafter appear and for purposes of illustration, but not of limitation, an embodiment of the invention is shown in the accompanying drawing in which:

FIG. 1 is a schematic sectional elevational view of one form of freezing plate assembly embodying the features of this invention; and FIG. 2 is a sectional elevational view similar to that of FIG. 1 showing a modification in the water trough.

In accordance with the practice of this invention, the freezing plates 10 are provided with a trough 12 extending lengthwise over the upper edges thereof. Instead of draining the water from the trough through openings in the bottom wall overlying the upper edges of the freezing plates, the water is made to overflow the trough from the top side so that the overflow will travel over the top wall and down the side walls to the upper edges of the freezing plates.

In the modification shown in FIG. 1, the trough 10 is in the form of a U-shaped member 22 which is closed at its ends and in which a continuous slot 24 extends lengthwise through the center of the top wall 26. Water is introduced into the trough through tubing at a constant rate to fill the trough whereby additional water overflows the trough through the slot for flow over the top wall 26 and down the side walls 28 to the upper edges of the freezing surfaces 30 of the freezing plates. In this modification, it is preferred to form the top wall with uniform concavity and to have the slot extend laterally to the downwardly sloped portions with the edges of the slot at the same level so that the overflow will be uniform crosswise as well as lengthwise and so that the overflow down the opposite sides will be uniform.

Instead of forming the trough with a continuous top opening or slot in the upper wall, the trough may be a completely enclosed tubular member 32 with laterally spaced apart rows 34 and 36 of longitudinally spaced openings 38. When the water is introduced into the trough in amount sufficient to fill the trough, the additional amounts of water introduced at uniform rate will place the water in the trough under slight pressure to cause the excess to flow upwardly through the openings for passage over the top wall and down the side walls to the freezing surfaces of the freezer plates.

Such flow from the top sides of the trough provides for more uniform distribution of water over the freezing surfaces without fear of clogging the openings. It will be understood that the foregoing concepts may be employed with the combination of trough and freezing plate wherein only one surface of the plate is used as a freezing surface for forming the ice cake, in which event the openings or the edge of the slot will be arranged on the corresponding slot of the top wall and at a level below the laterally spaced edges or openings on the opposite side so that the water will flow from the openings or slots only in the one direction.

The means of distribution embodying the features of this invention also permits controlled variation in the amount of flow of water lengthwise of the plate, as by variation in the cross-section of the trough.

Improvement also resides in the construction of the freezer plates wherein the freezer plates are formed of two sheets 40 and 42 of metal welded one to the other along staggered lines to provide interconnecting channels 44 when the two sheets are expanded under pressure. Thus the sheets become spaced one from the other with one series of interconnecting channels 44 defined therebetween through which cold refrigerant can be circulated for freezing and warm refrigerant circulated to release the ice cake formed on the outer surfaces thereof or with two series of interconnecting channels each distinct from the other defined therebetween. Through one series cold refrigerant can be circulated for freezing, while at intervals through the other series, water can be circulated to release the ice cake formed on the outer surface. Alternatively, electric heating elements can be inserted into one series of channels for harvesting heat. Clearly the plate is not heated and cooled simultaneously.

It will be apparent from the foregoing that we have provided substantial improvements in the construction and operation of the ice making device and that changes may be made in the details of construction, arrangement and operation without departing from the spirit of the invention, especially as defined in the following claims.

We claim:

1. In an icemaking apparatus, a pair of vertically disposed freezing plates joined one to the other, the outer surfaces of said plates comprising freezing surfaces and the inner surfaces comprising refrigeration surfaces for the passage of refrigerant in contact therewith to reduce the temperature of the freezing surfaces to below freezing temperature and means for flowing water over the freezing surfaces in an amount in excess of the amount congealed on the surfaces to form ice cakes on the surfaces thereof, in which the means for flowing water uniformly over the freezing surfaces comprises an elongate trough dimensioned to have a length corresponding to the width of the freezing surfaces of the plates and positioned on the upper edges thereof, said trough having side walls and bottom walls which extend angularly downwardly into engagement with the upper edges of the freezing surfaces and end walls which extend upwardly continuously from the outer edges of the bottom walls and side walls to define a container therebetween, whereby when water is introduced into the trough, the water overflows from the trough about the side walls and bottom walls to the freezing surfaces, and in which the trough is joined to the plates at their upper ends.

2. An icemaking apparatus as claimed in claim 1 in which the trough is formed from the upper end portions of the plates and integral therewith.

3. An icemaking apparatus as claimed in claim 1 in which the opening is in the form of a slot extending continuously through the length thereof through which the water issues from the trough for flow downwardly over the portions of the top wall outwardly of the slot and down the side and bottom walls to the freezing surface.

4. An icemaking apparatus as claimed in claim 3 in which the slot is at the same level throughout the length thereof.

5. An icemaking apparatus as claimed in claim 1 in which the trough and the top wall together form an enclosed tubular member with longitudinally spaced openings in the upper quadrant thereof.

6. An icemaking apparatus as claimed in claim 1 in which the trough and the top wall together form an enclosed tubular member with a continuous longitudinally extending slot in the upper quadrant thereof.

7. In an icemaking apparatus having a vertically disposed freezing plate formed of a freezing surface on one side and refrigeration means on the other side for reducing the temperature of the freezing surface to below freezing temperature and means for flowing water over the freezing surface in an amount in excess of the amount congealed on the surface to form an ice cake, the improvement in the means for flowing water uniformly over the freezing surface comprising an elongate trough dimensioned to have a length corresponding to the length of the freezing surface of the plate and positioned on the upper edge thereof, said trough having a bottom wall which extends angularly downwardly into engagement with the upper edge of the freezing surface and side and end walls which extend upwardly continuously from the outer edges of the bottom wall to define a container, and means for introducing water into the trough whereby the water overflows from the trough about the side walls for flow downwardly over the side walls and bottom wall to the freezing surface and in which the freezing plate comprises a pair of metal sheets in which the trough is formed integrally of the sheets at their upper ends.

8. In an icemaking apparatus having a vertically disposed freezing plate formed of a freezing surface on one side and refrigeration means on the other side for reducing the temperature of the freezing surface to below freezing temperature and means for flowing water over the freezing surface in an amount in excess of the amount congealed on the surface to form an ice cake, the improvement in the means for flowing water uniformly over the freezing surface comprising an elongate trough dimensioned to have a length corresponding to the length of the freezing surface of the plate and positioned on the upper edge thereof, said trough having a bottom wall which extends angularly downwardly into engagement with the upper edge of the freezing surface and side and end walls which extend upwardly continuously from the outer edges of the bottom wall to define a container, and means for introducing water into the trough whereby the water overflows from the trough about the side walls for flow downwardly over the side walls and bottom wall to the freezing surface in which the freezing plate comprises a pair of plates having outwardly facing outer freezing surfaces and in which the openings in the top wall of the trough are on the same level on opposite sides of the center of the top wall for uniform flow of water down both sides of the trough to the freezing surfaces of the plates and in which the pair of metal sheets are joined adjacent their upper edge portion and formed to define the trough for distribution of water over the freezing surfaces of the sheets.

References Cited

UNITED STATES PATENTS

| | | | |
|---|---|---|---|
| 2,297,348 | 9/1942 | Derleth | 239—193 |
| 2,616,670 | 11/1952 | Van der Molen | 239—193X |
| 2,746,262 | 5/1956 | Gallo | 62—347UX |
| 2,997,861 | 8/1961 | Kocher et al. | 62—348X |
| 3,171,266 | 3/1965 | Weiss | 62—348X |
| 3,430,452 | 3/1969 | Dedricks et al. | 62—347X |

WILLIAM E. WAYNER, Primary Examiner

U.S. Cl. X.R.

62—74